US007895608B1

(12) United States Patent
Jha et al.

(10) Patent No.: US 7,895,608 B1
(45) Date of Patent: *Feb. 22, 2011

(54) VIRTUAL PROCESSING CHAINS

(75) Inventors: Ashutosh K. Jha, Sunnyvale, CA (US); Anand Rajagopalan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/418,445

(22) Filed: Apr. 3, 2009

Related U.S. Application Data (63) Continuation of application No. 11/228,692, filed on Sep. 16, 2005, now Pat. No. 7,523,467.

(51) Int. Cl.
*G06F 13/00* (2006.01)
(52) U.S. Cl. .................. 719/321; 719/322; 719/323
(58) Field of Classification Search .......... 719/322, 719/323, 321
See application file for complete search history.

(56) References Cited

U.S. PATENT DOCUMENTS

| 7,047,534 | B2 | 5/2006 | Sadovsky et al. |
| 7,426,637 | B2 | 9/2008 | Risan et al. |
| 2005/0120359 | A1 | 6/2005 | Shoji et al. |
| 2008/0127228 | A1 | 5/2008 | Durojaiye et al. |

*Primary Examiner*—Andy Ho
(74) *Attorney, Agent, or Firm*—Patterson & Sheridan, LLP (57) ABSTRACT

One embodiment of the invention is an architecture for improving the performance of a computer system containing a plurality of hardware input/output devices. The architecture implements an operating system configured to perform all related input/output operations within the operating system kernel. Thus, the operating system enables a first device driver that produces data to pass data directly to a second device driver that consumes data, without a context switch. One advantage of this approach is that computer system performance may be substantially increased due to a reduction in context switching.

20 Claims, 7 Drawing Sheets

VIRTUAL PROCESSING CHAINS

CROSS-REFERENCE TO RELATED APPLICATIONS

This application is a continuation of application Ser. No. 11/228,692 filed on Sep. 16, 2005 now U.S. Pat. No. 7,523,467, issued on Apr. 21, 2009. The subject matter of this related application is hereby incorporated by reference.

BACKGROUND OF THE INVENTION

1. Field of the Invention

Embodiments of the present invention relate generally to the field of computer systems and more specifically to computer system architectures that implement virtual processing chains.

2. Description of the Related Art

Application programs perform application-specific tasks such as word processing, spreadsheet editing, and email browsing. Hardware and operating system security features prevent application programs from accessing memory locations or executing program instructions that directly control input/output hardware. Thus, input/output operations required by application programs, such as storing information to disk or transmitting information over a computer network, are performed by operating system programs that control the input/output hardware (referred to herein as "input/output devices").

An operating system typically contains a collection of device driver programs that control individual input/output devices and communicate only with the operating system. Therefore, an application program that transfers data from a first input/output device to a second input/output device must initially transfer data from the device driver corresponding to the first input/output device to the application program, and then transfer the data from the application program to the second device driver corresponding to the second input/output device.

Computer system hardware distinguishes operating system software and memory locations from application program software and memory locations by a security setting in the hardware. This setting indicates whether the hardware is in "user" or "privileged" mode. Application programs run in user mode, and the operating system runs in privileged mode. Changing between user and privileged modes causes the operating system to perform a context switch, in which the operating system writes/reads the microprocessor state (i.e. the value of all microprocessor registers and status flags) to/from memory to ensure program coherency. Since each context switch takes a certain amount of time to perform, performing a large number of context switches may have a substantial impact on overall computer system performance.

Figure 1:
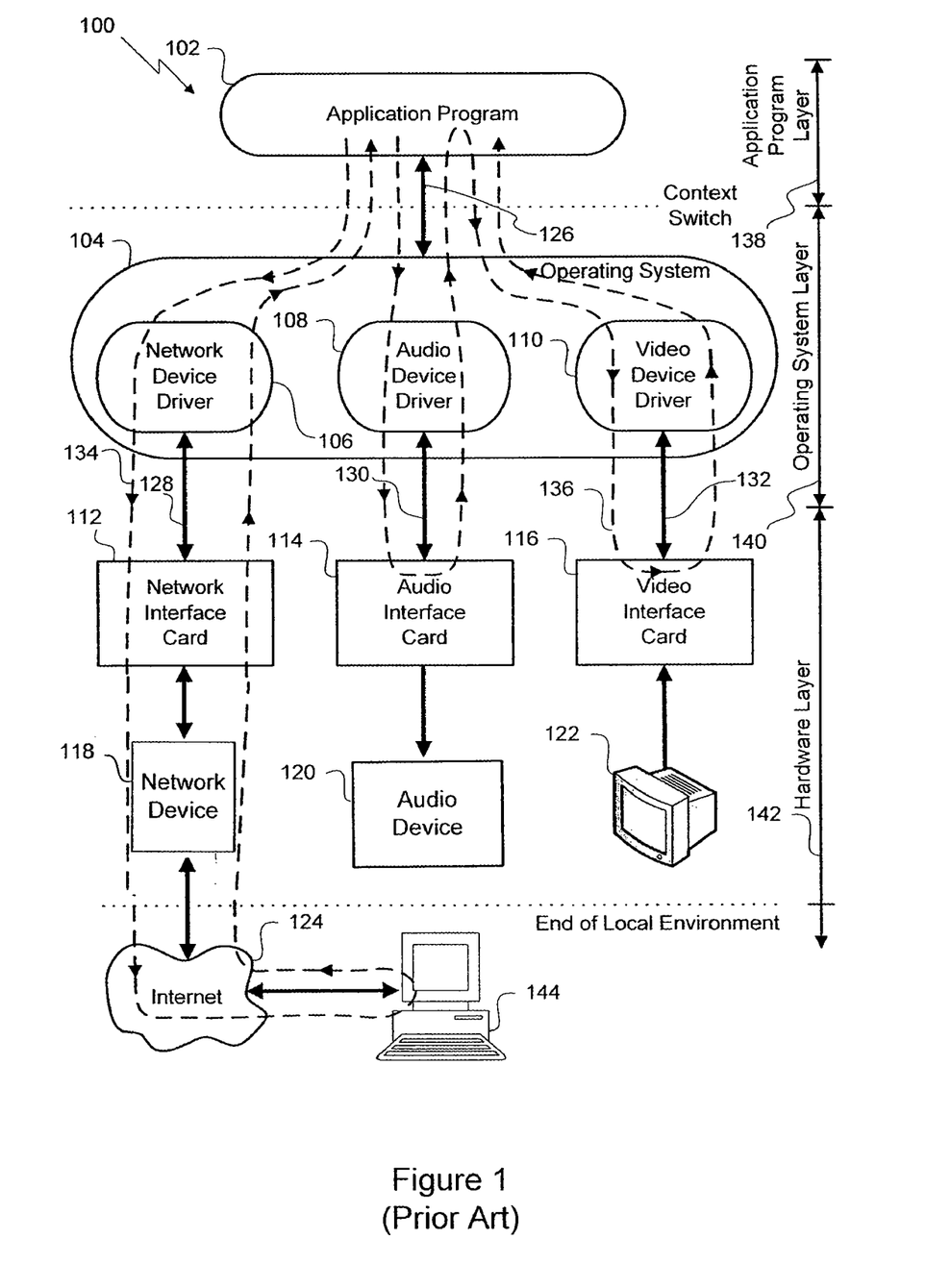
FIG. 1 is a conceptual diagram of a prior art computer system.

To better understand the drawbacks of the current hardware/software architecture, consider a computer system configured to request and process multimedia data (e.g. audio data and video data) from the Internet. FIG. 1 is a conceptual diagram of a computer system 100 that contains the components of the current hardware/software architecture necessary to request and process multimedia data from the server 144 on Internet 124. The computer system 100 includes an application program layer 138, an operating system layer 140, and a hardware layer 142. Hardware and software components of the computer system 100 communicate through hardware/software interfaces 128, 130 and 132. As shown, any communication between the application program layer 138 and the operating system layer 140 through a software interface 126 causes a context switch.

The request portion of a request/process operation begins with an application program 102 requesting data by signaling an operating system 104 to read multimedia data from a server 144 on the Internet 124 through a network device 118. This communication between the application program layer 138 and the operating system layer 140 causes the first of a series of context switches. The operating system 104 continues the request operation by signaling a network device driver 106 to request data from a network interface card 112. The network interface card 112 subsequently requests data from the network device 118, which requests and receives data from the server 144 on the Internet 124 and then transmits the data to the network interface card 112. The network interface card 112 transmits the data to the network device driver 106, which signals the operating system 104 that data has been received. The operating system 104 either transfers the data from the network device driver 106 to the application program 102 or enables the application program 102 to access the data from the network device driver 106. The operating system 104 also signals the application program 102 that the read from the server 144 on the Internet 124 is complete, causing a second context switch. A communication path 134 represents the sequence of communications that occur within the request portion of the request/process operation.

The processing portion of a request/process operation begins with the application program 102 decoding the multimedia data received from the network device driver 106 into audio data and video data. After decoding the multimedia data, the application program 102 requests the operating system 104 to transfer the audio data to an audio interface card 114. Since this request crosses the boundary between the application program layer 138 and the operating system layer 140, the request causes a third context switch. In response, the operating system 104 transfers the audio data to an audio device driver 108. The audio device driver 108 transfers the audio data to the audio interface card 114, which communicates with an audio device 120 to produce sound. When the data transfer has been completed, the audio device driver 108 signals the operating system 104 that data has been transmitted to the audio interface card 114. Likewise, the operating system 104 signals the application program 102 that the audio data has been properly transferred, causing a fourth context switch. The application program 102 also requests the operating system 104 to transfer the video data from the application program 102 to a video interface card 116. Again, since this request crosses the boundary between the application program layer 138 and the operating system layer 140, the request causes a fifth context switch. In response, the operating system 104 transfers the video data from the application program 102 to a video device driver 110. The video device driver 110 transfers the video data to the video interface card 116, which communicates with a video device 122 to produce a video display on the video device 122. When the data transfer is complete, the video device driver 110 signals the operating system 104 that data has been transferred to the video interface card 116. Similarly, the operating system 104 signals the application program 102 that the video data has been properly transferred, causing a sixth context switch. A communication path 136 represents the sequence of communications that occur within the processing portion of the request/process operation.

As the foregoing illustrates, a relatively simple request/process operation results in six context switches. Large request/process operations are often divided into multiple, smaller request/process operations, thereby multiplying the number of context switches performed by the computer system 100 and further degrading overall performance.

Another drawback of the architecture of the computer system 100 is that the data transfers involving software components require the software components to buffer any data they receive. Since the computer system 100 has three device drivers and an application program that receive data, four software buffers are required to perform routine request/process operations. As is well-known, creating, operating and managing software buffers generates software overhead, which also degrades overall system performance.

An alternative configuration of the computer system 100 exchanges a buffer handle rather than passing buffers between software components. In this version of the computer system 100, a single software buffer exists, either in the network device driver 106 or in the operating system 104, and a handle to that buffer is passed between software components as the data is processed by successive device drivers. For example, a data buffer containing multimedia data in the network device driver 106 has a handle that is initially transferred to the application program 102, causing a context switch. The application program 102 transfers the handle to the audio device driver 108 to allow the audio device driver to process the audio data in the buffer, causing a second context switch. The audio device driver 108 then transfers the handle back to the application program 102 after processing the audio data in the buffer, causing a third context switch. Next, the application program 102 transfers the data buffer handle to the video device driver 110 to allow the video device driver to process the video data in the buffer, causing a fourth context switch. Again, the video device driver 110 then transfers the handle back to the application program 102 after processing the video data in the buffer, causing a fifth context switch. The processing operation concludes when the application program 102 transfers the handle to the network device driver 106 to allow additional multimedia data to be added to the buffer, causing a sixth context switch. Thus, as with the previous configuration of the computer system 100, six context switches are performed during the process operation, As the foregoing illustrates, what is needed in the art is a computer system architecture that reduces context switching as well as the number of buffers in the computer system.

SUMMARY OF THE INVENTION

One embodiment of the present invention is a computing device having an operating system that includes a first device driver and a second device driver, and a hardware layer that includes a first input/output device controlled by the first device driver and a second input/output device controlled by the second device driver. The first input/output device is configured to transmit data to the first device driver, the first device driver is configured to transmit data directly to the second device driver, and the second device driver is configured to transmit data to the second input/output device.

One advantage of the disclosed computer system is that the operating system is configured to perform all related input/output operations within the operating system kernel. Thus, the operating system enables data to be transmitted from the first device driver to the second device driver without a context switch. Such an approach may substantially increase overall computer system performance due to a reduction in context switching.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
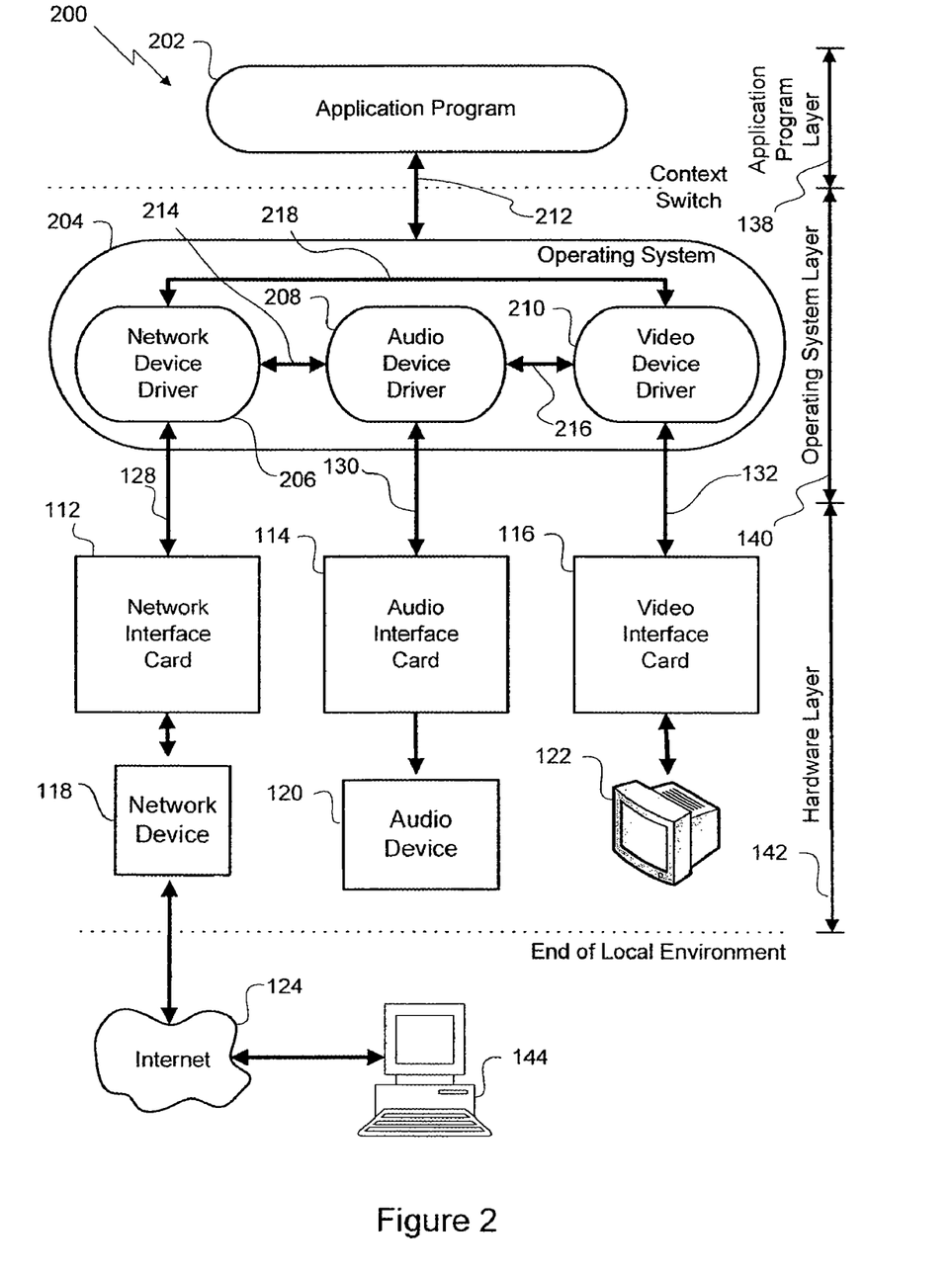
FIG. 2 is a conceptual diagram of a computer system configured to exchange data directly between device drivers, according to one embodiment of the invention.

FIG. 2 is a conceptual diagram of a computer system 200 configured to exchange data directly between device drivers 206, 208 and 210, according to one embodiment of the invention. As shown, the computer system 200 includes, without limitation, an application program 202 that resides in the application program layer 138, an operating system 204 that resides in the operating system layer 140, and the network interface card 112, the network device 118, the audio interface card 114, the audio device 120, the video interface card 116 and the video device 122 that reside in the hardware layer 142. The application program 202 communicates with the operating system 204 through the software interface 212. The network device driver 206 communicates with the network interface card 112 through the hardware/software interface 128, the audio device driver 208 communicates with the audio interface card 114 through the hardware/software interface 130, and the video device driver 210 communicates with the video interface card 116 through the hardware/software interface 132.

The operating system 204 includes, without limitation, the network device driver 206 configured to control the network interface card 112, the audio device driver 208 configured to control the audio interface card 114, and the video device driver 210 configured to control the video interface card 116. Importantly, the device drivers are configured to communicate directly with each other through a series of software interfaces. The network device driver 206 communicates with the audio device driver 208 through a software interface 214, the audio device driver 208 communicates with the video device driver 210 through a software interface 216, and the video device driver 210 communicates with the network device driver 206 through a software interface 218. As is well known, since the operating system 204 contains the device drivers, the device drivers are also configured to communicate with the operating system 204 using various software interfaces (not shown).

In one embodiment, software "handles" are used to create the software interfaces between the device drivers that enable the device drivers to directly communicate with one another. Those skilled in the art will readily recognize that handles are software data structures that identify hardware devices, such as hardware interface cards. In the computer system 200, a software interface is created between two device drivers by having the application program 202 issue a "bridge command" between the handles of the corresponding hardware interface cards. Once the bridge command has been issued, direct communication between the device drivers may occur. Thus, the software interface 214 is created by a bridge command between the handles for the network interface card 112 and the audio interface card 114. Likewise, the software interface 216 is created by a bridge command between the handles for the audio interface card 114 and the video interface card 116. Finally, the software interface 218 is created by a bridge command between the handles for the video interface card 116 and the network interface card 112. In other embodiments, direct communication between the device drivers may be established using any other technically feasible approach.

The operation of the computer system 200 is illustrated by describing the steps of a multimedia data request/process operation. The request portion of a request/process operation begins with the application program 202 requesting data by signaling the operating system 204 to request and process multimedia data from the server 144 on the Internet 124, through the network device 118. This communication between the application program layer 138 and the operating system layer 140 causes a first context switch. The operating system 204 continues the request/process operation by signaling the network device driver 206 to request/process data from the network interface card 112 through the hardware/software interface 128. The network interface card 112 subsequently requests data from the network device 118, which requests and receives data from the server 144 on the Internet 124 and then transfers the data to the network interface card 112. The request portion of the request/process operation concludes when the network interface card 112 transfers the data to the network device driver 206.

The processing portion of the request/process operation begins with the network device driver 206 decoding the multimedia data into audio data and video data. After decoding the multimedia data, the network device driver 206 transfers the audio data to the audio device driver 208. The audio device driver 208 transfers the audio data to the audio interface card 114, which communicates with the audio device 120 to produce sound. Similarly, the network device driver 206 transfers the decoded video data to the video device driver 210. The video device driver 210 transfers the video data to the video interface card 116, which communicates with the video device 122 to produce a video display on the video device 122. When both the audio and video data have been transferred to the appropriate hardware devices, the network device driver 206 signals the operating system 204 that the multimedia data has been processed. The processing portion of the request/process operation concludes when the operating system 204 signals the application program 202 that the multimedia data has been properly processed. The inter-layer communication between the application program 202 and the operating system 204 causes a second context switch.

In one embodiment of the computer system 200, a total of three software data buffers exist in the device drivers for storing data transferred during request/process operations. Although not shown in FIG. 2, it is common knowledge among those skilled in the art that the device drivers contain such data buffers. Thus, referring back to the above example, the network device driver 206 contains one software data buffer used for storing the multimedia data received from the network interface card 112. The audio device driver 208 contains one software data buffer used for storing the audio data received from the network device driver 206. Similarly, the video device driver 210 contains one software data buffer used for storing the video data received from the network device driver 206. Importantly, since no data is transferred to the application program 202 when the request/process operation is executed, a software data buffer is not required in the application program layer 138. Thus, the computer system 200 includes one less software data buffer than the prior art computer system 100.

In an alternative embodiment of the computer system 200, one software data buffer exists in the network device driver 206 for storing all data received during a request/process operation. A first context switch occurs in this embodiment when the application program 202 initiates the request/process operation by signaling the network device driver 206 to request and process multimedia data. After the network device driver 206 receives the multimedia data, it stores the data in the data buffer and a handle to the data buffer is passed to the other device drivers in the operating system 204. Upon receiving the data buffer handle, each of the other device drivers processes the portion of the multimedia data in the data buffer whose data type (e.g. audio data) corresponds to the data type processed by that particular device driver. For example, when the audio device driver 208 has the data buffer handle, it processes any audio data in the data buffer, but it does not process video data or any other data type in the data buffer. In the computer system 200, the network device driver 206 passes the data buffer handle to the audio device driver 208 (via the software interface 214), allowing the processing of audio data, and then to the video device driver 210 (via the software interface 216), allowing the processing of video data. The video device driver 210 then passes the handle back to the network device driver 206 (via the software interface 218), allowing more multimedia data to be requested for processing. A second and final context switch occurs when the network device driver 206 signals to the application program 202 that the device drivers have completed the request/process operation. Importantly, since no data buffer handle transfers occur between the device drivers and the application program, this alternative embodiment of computer system 200 (where handles are exchanged in lieu of buffer transfers) includes three less handle transfers than the corresponding alternative configuration of prior art computer system 100 (where handles are exchanged in lieu of buffer transfers).

Figure 3A:
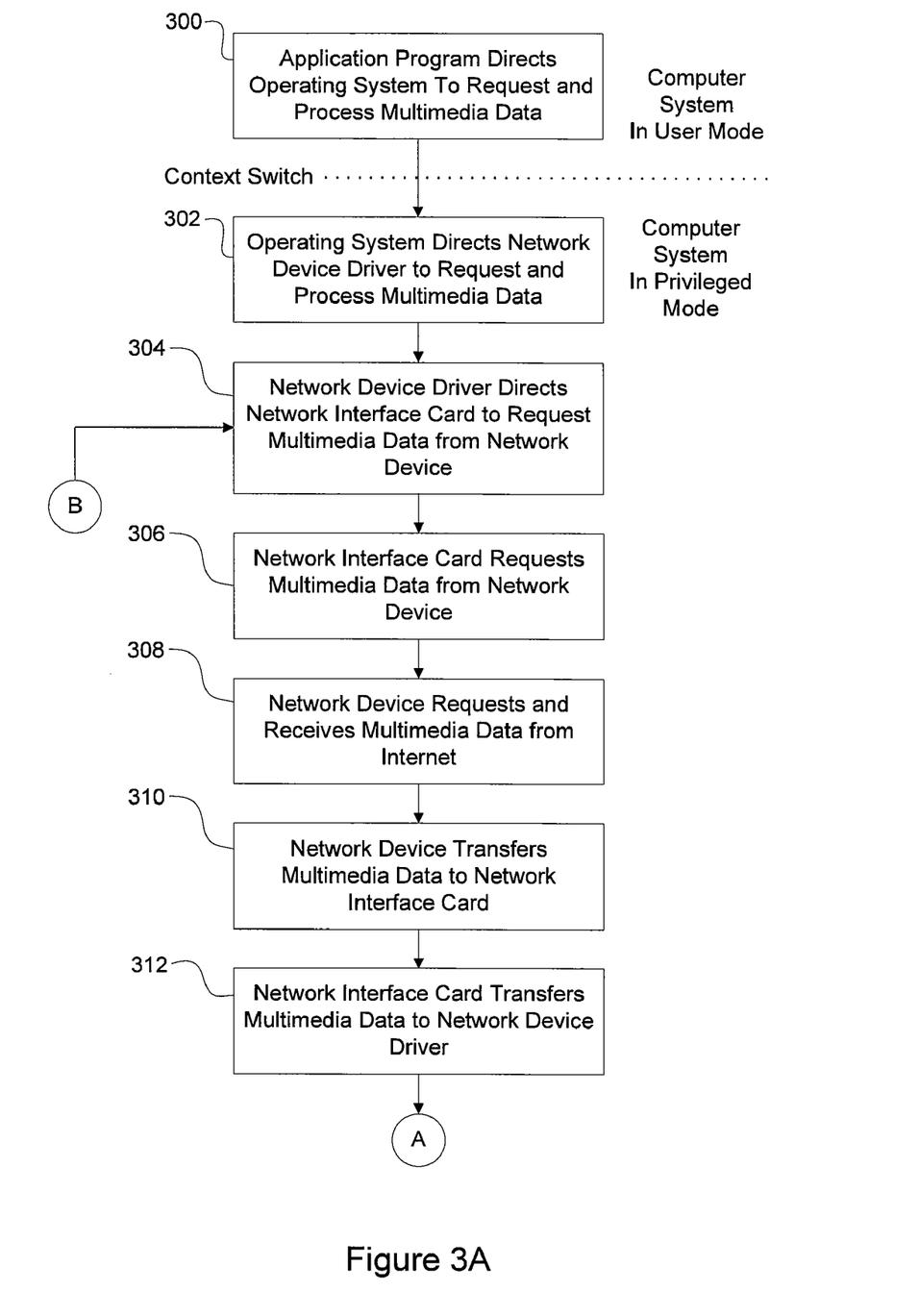
FIGS. 3A and 3B a flowchart of method steps for requesting and processing data using direct data exchanges between device drivers, according to one embodiment of the invention.
Figure 3B:
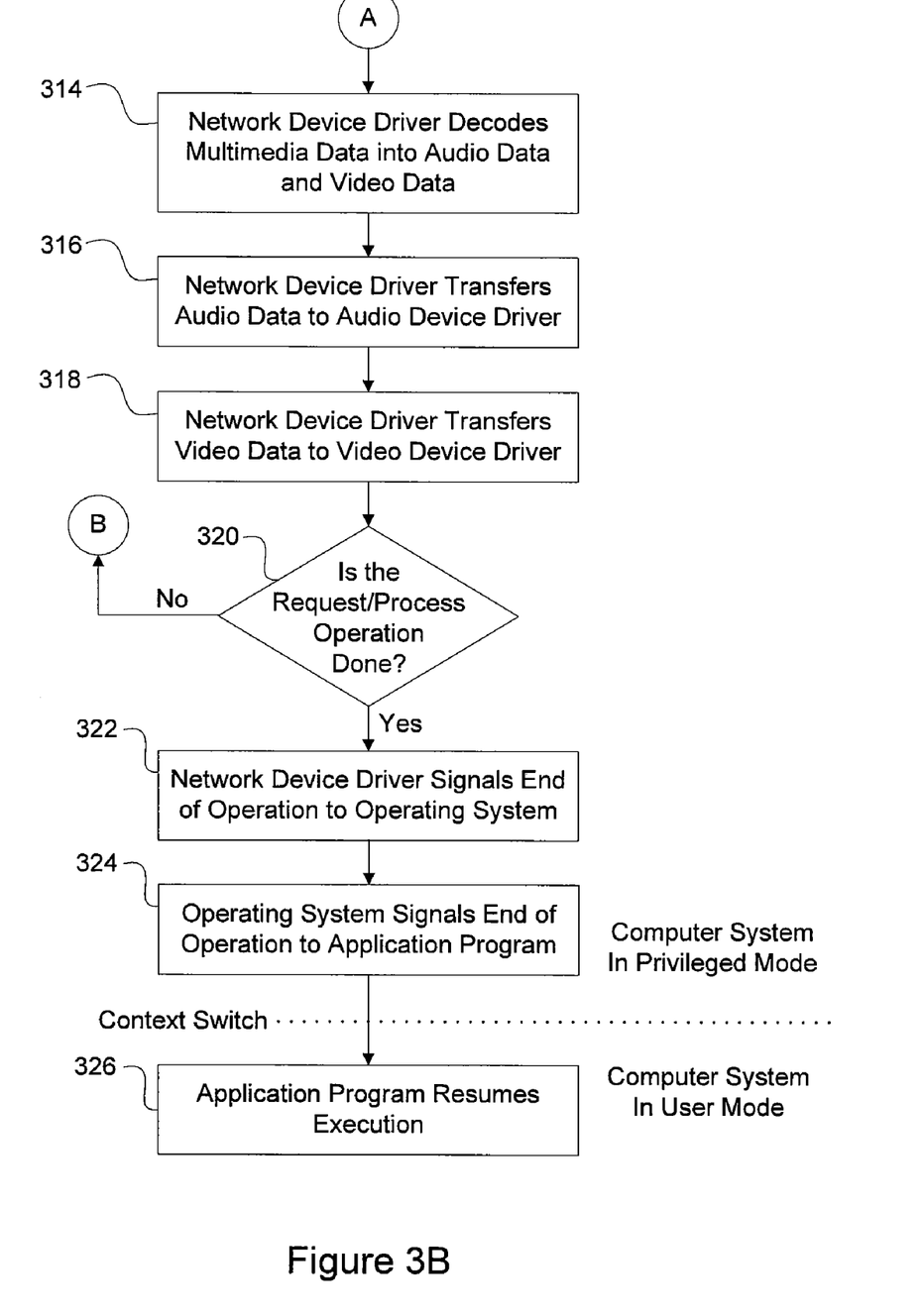

FIGS. 3A and 3B present a flowchart of method steps for requesting and processing data using direct data exchanges between device drivers, according to one embodiment of the present invention. Persons skilled in the art will recognize that any system configured to perform the method steps in any order is within the scope of the invention.

As shown, the method of performing a data request/process operation begins in step 300, where the application program 202 directs the operating system 204 to request and process multimedia data. Step 300 is performed while the computer system 200 is in user mode. In step 302, the operating system 204 directs the network device driver 206 to request and process multimedia data from the network interface card 112. Unlike step 300, step 302 is performed while the computer system 200 is in privileged mode. The switch from user mode to privileged mode results in a first context switch. In step 304, the network device driver 206 directs the network interface card 112 to request multimedia data from the network device 118. In step 306, the network interface card 112 requests multimedia data from the network device 118. In step 308, the network device 118 requests and receives multimedia data from the server 144 on the Internet 124. In step 310, the network device 118 transfers the multimedia data to the network interface card 112. In step 312, the network interface card 112 transfers the multimedia data to the network device driver 206. In step 314, the network device driver 206 decodes the multimedia data into audio data and video data. In step 316, the network device driver 206 transfers the audio data to audio device driver 208 through the software interface 214. The audio device driver 208 then communicates with the audio interface card 114 through the hardware/software interface 130 to produce sound in audio device 120. In step 318, the network device driver 206 transfers the video data to the video device driver 210 through the software interface 218. The video device driver 210 communicates with the video interface card 116 through hardware/software interface 132 to produce a video display on the video device 122.

In step 320, the network device driver 206 determines if all data necessary for fully executing the request/process operation has been received and processed. If the request/process operation is not complete, then the method returns to step 304. However, if the request/process operation is complete, then the method proceeds to step 322 where the network device driver 206 signals the operating system 204 that the request/process operation is complete. In step 324, the operating system 204 signals the application program 202 that the request/process operation is complete. In step 326, the application program 202 resumes execution from the instruction immediately following the request to perform the request/process operation. As indicated in FIG. 3B, step 324 is performed when the computer system 200 is in privileged mode, and step 326 is performed when the computer system 200 is in user mode. The switch from privileged mode to user mode between these two steps results in another context switch.

As the foregoing descriptions illustrate, one advantage of the disclosed computer system architecture is that executing a request/process operation results in only two context switches, which is substantially fewer than the six context switches that result with prior art architectures. Further, the request/process operation requires only three software data buffers, as opposed to the four software data buffers required with prior art architectures. Finally, the fact that the data and instructions remain local to the operating system 204 in the architecture of computer system 200 presents the opportunity for increased caching, which may result in additional performance improvements. If data buffer handles are exchanged in lieu of performing buffer transfers, the request/process operation requires only two context switches and three handle exchanges, which is less than the six context switches and six handle exchanges that result with corresponding prior art architectures.

Persons skilled in the art will understand that even though the examples provided herein pertain to multimedia data request/process operations, any type of request/process operation may be executed using the architecture of the computer system 200. In addition, although the input/output devices in the computer system 200 are depicted as hardware interface cards, the principles of the present invention apply with equal force to any type of input/output devices implemented in the computer system 200. Alternative embodiments also allow for communication between a greater/lesser number of device drivers or hardware interface cards by adding/removing device drivers to the operating system 204 or hardware interface cards to/from the hardware layer 142. Further, one device driver may control more than one hardware interface card. Likewise, one hardware interface card may be controlled by more than one device driver. Finally, in alternative embodiments, the operating system 204 may be configured to initiate request/process operations without the influence or presence of an application program.

Although the computer system 200 may provide substantial performance improvements over the computer system 100, additional performance improvements may be realized by configuring a computer system to exchange data directly between hardware interface cards rather than directly between device drivers. The following paragraphs describe this alternative embodiment.

Figure 4:
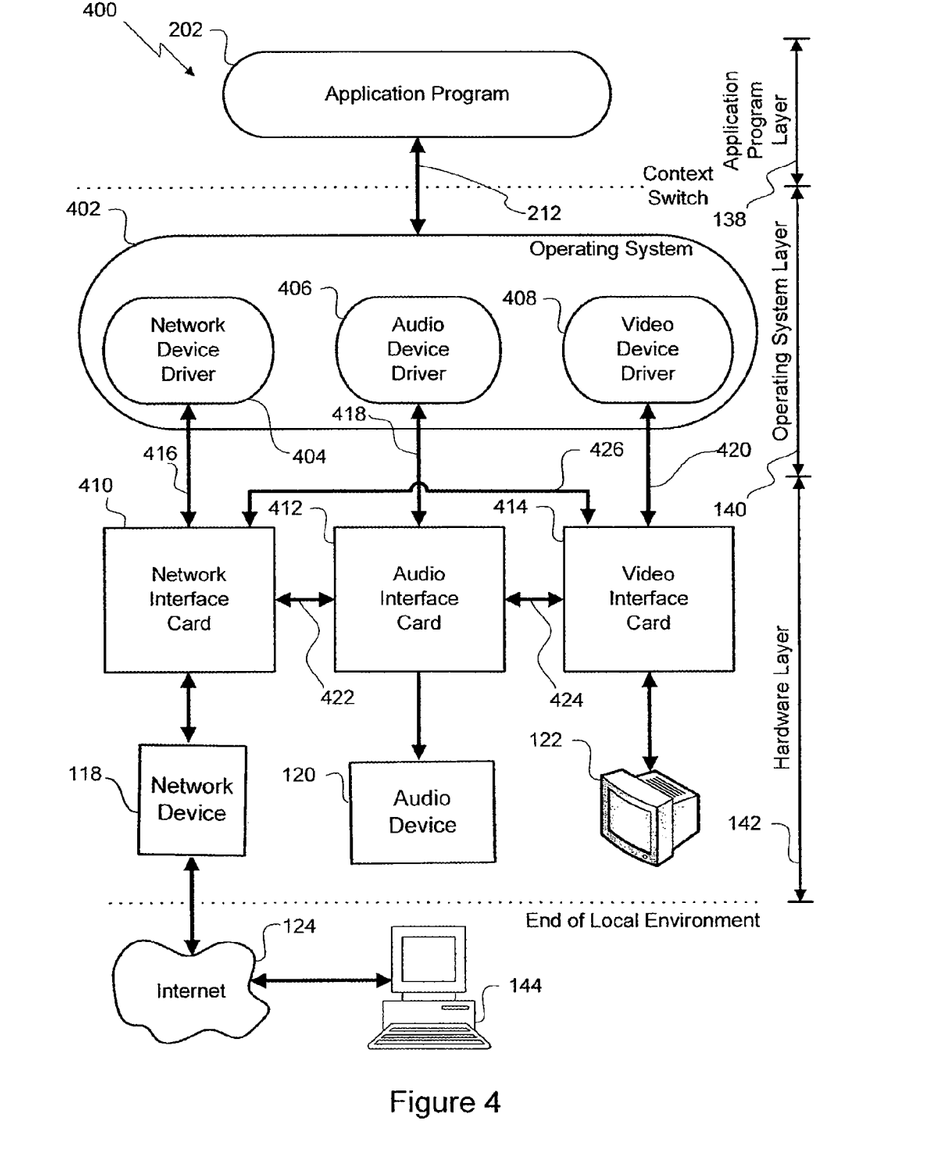
FIG. 4 is a conceptual diagram of a computer system configured to exchange data directly between hardware interface cards, according to one embodiment of the invention.

FIG. 4 is a conceptual diagram of a computer system 400 configured to exchange data directly between hardware interface cards 410, 412 and 414, according to one embodiment of the invention. As shown, the computer system 400 includes, without limitation, the application program 202 that resides in the application program layer 138, an operating system 402 that resides in the operating system layer 140, and a network interface card 410, the network device 118, an audio interface card 412, the audio device 120, a video interface card 414 and the video device 122 that reside in the hardware layer 142. The application program 202 communicates with an operating system 402 through the software interface 212. The network device driver 404 communicates with the network interface card 410 through a hardware/software interface 416, the audio device driver 406 communicates with the audio interface card 412 through a hardware/software interface 418, and the video device driver 408 communicates with the video interface card 414 through a hardware/software interface 420. Importantly, the hardware interface cards are configured to communicate directly with each other through a series of hardware interfaces. The network interface card 410 communicates with the audio interface card 412 through a hardware interface 422, the audio interface card 412 communicates with the video interface card 414 through a hardware interface 424, and the video interface card 414 communicates with the network interface card 410 through a hardware interface 426.

In one embodiment, to enable the hardware interface cards to directly communicate with one another, software handles are used to establish communication through the hardware interfaces between the hardware interface cards. More specifically, communication is enabled between two hardware interface cards by having the application program 202 issue a bridge command between the handles corresponding to the two hardware interface cards. In response to the bridge command, the device drivers that control the two hardware interface cards enable (i.e., "turn on") the hardware interface between the two hardware interface cards. Once the hardware interface is enabled, direct communication between the hardware devices may occur. Thus, in computer system 400, the hardware interface 422 is created by a bridge command between the handles for the network interface card 410 and the audio interface card 412. Likewise, the software interface 424 is created by a bridge command between the handles for the audio interface card 412 and the video interface card 414. Finally, the software interface 426 is created by a bridge command between the handles for the video interface card 414 and the network interface card 410. In other embodiments, direct communication between the hardware interface cards may be established using any other technically feasible approach.

The operating system 402 includes, without limitation, a network device driver 404 configured to control the network interface card 410, an audio device driver 406 configured to control the audio interface card 412, and a video device driver 408 configured to control the video interface card 414. As is well known, since the operating system 402 contains the device drivers, the device drivers are also configured to communicate with the operating system 402 using various software interfaces (not shown).

The operation of the computer system 400 is illustrated by describing the steps of a multimedia data request/process operation. The request portion of a request/process operation begins with an application program 202 requesting data by signaling the operating system 402 to request and process multimedia data from the server 144 on the Internet 124, through the network device 118. This communication between the application program layer 138 and the operating system layer 140 causes a first context switch. The operating system 402 continues the request/process operation by signaling the network device driver 404 to request/process data from the network interface card 410 through the hardware/software interface 416. The network interface card 410 subsequently requests data from the network device 118, which requests and receives data from the server 144 on the Internet 124. The request portion of the request/process operation concludes when the network device 118 transfers the data to the network interface card 410.

The processing portion of the request/process operation begins with the network interface card 410 decoding the multimedia data into audio data and video data. After decoding the multimedia data, the network interface card 410 transfers the audio data directly to the audio interface card 412, which communicates with the audio device 120 to produce sound. Similarly, the network interface card 410 transfers the decoded video data directly to the video interface card 414, which communicates with the video device 122 to produce a video display on the video device 122. When both the audio and video data have been transferred to the appropriate hardware devices, the network interface card 410 signals the network device driver 404 that the multimedia data has been processed. The processing portion of the request/process operation concludes when the network interface card 410 signals the network device driver 404 that the multimedia data has been properly processed. Upon receiving this signal, the network device driver 404 signals the operating system 402 that the multimedia data has been processed. Finally, the operating system 402 signals the application program 202 that the multimedia processing is complete. The inter-layer communication between the application program 202 and the operating system 402 causes a second context switch.

In this embodiment, since all data transfers occur in the hardware layer 142, no software data buffers need to be generated and operated in any of the device drivers or in the application program layer 138. Thus, the computer system 400 includes four less software data buffers than the prior art computer system 100.

Figure 5A:
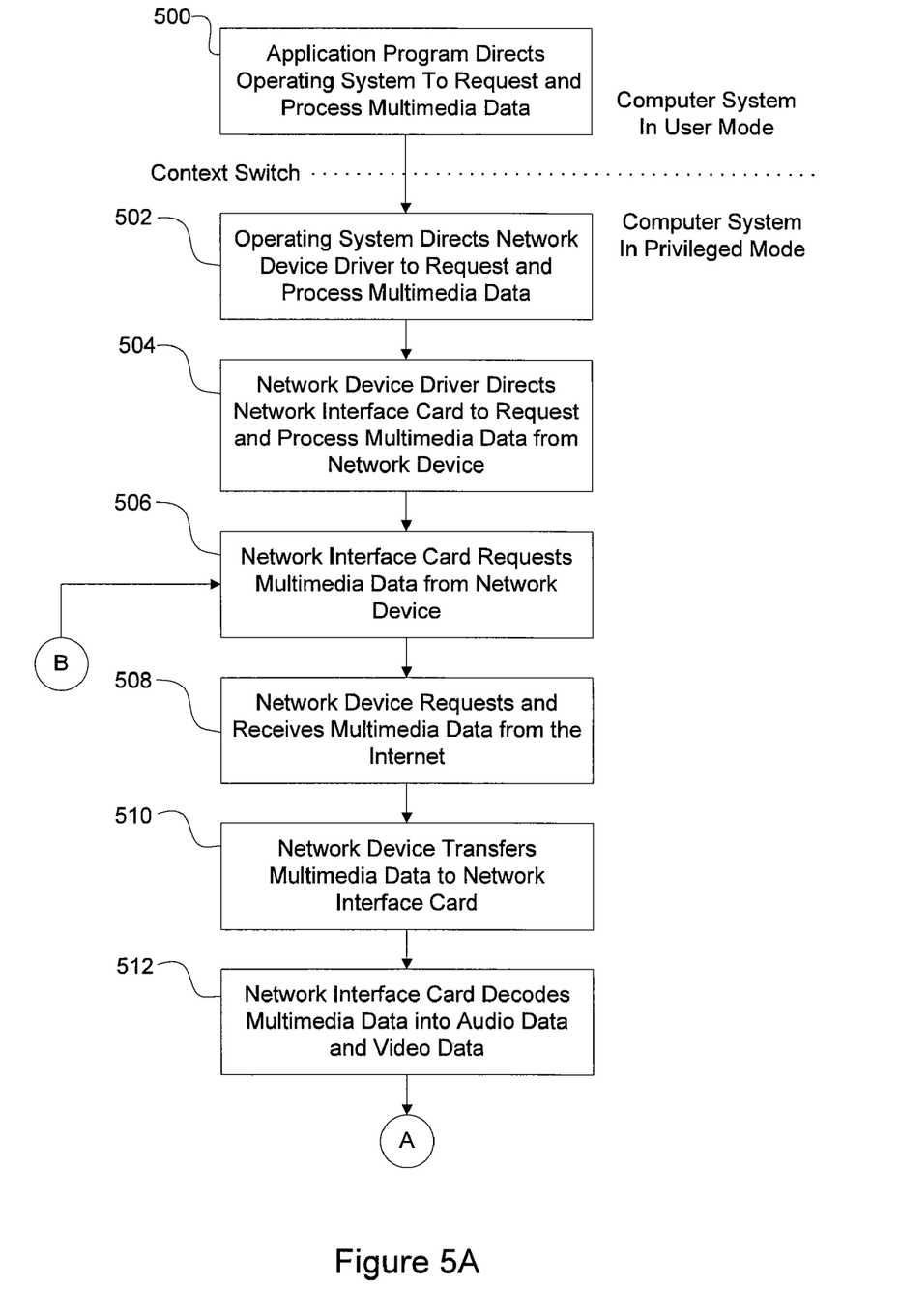
FIGS. 5A and 5B present a flowchart of method steps for requesting and processing data using direct data exchanges between hardware interface cards, according to another embodiment of the invention.
Figure 5B:
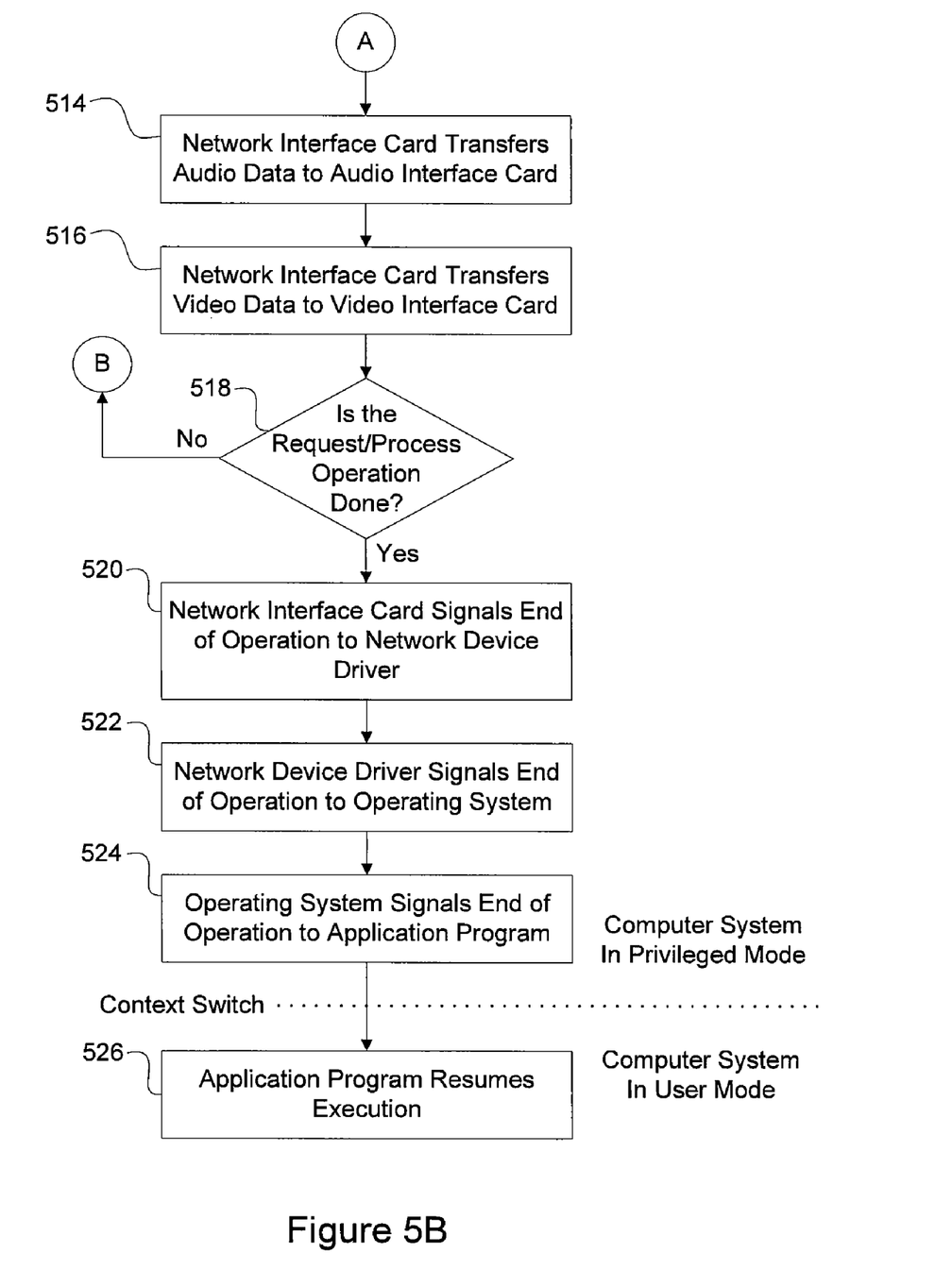

FIGS. 5A and 5B present a flowchart of method steps for requesting and processing data using direct data exchanges between hardware interface cards, according to one embodiment of the present invention. Persons skilled in the art will recognize that any system configured to perform the method steps in any order is within the scope of the invention.

As shown, the method of performing a data request/process operation begins in step 500, where the application program 202 directs the operating system 402 to request and process multimedia data. Step 500 is performed while the computer system 400 is in user mode. In step 502, the operating system 402 directs the network device driver 404 to request and process multimedia data from the network interface card 410. Unlike step 500, step 502 is performed while the computer system 200 is in privileged mode. The switch from user mode to privileged mode results in a first context switch. In step 504, the network device driver 404 directs the network interface card 410 to request and process multimedia data from the network device 118. In step 506, the network interface card 410 requests multimedia data from network device 118. In step 508, the network device 118 requests and receives multimedia data from the server 144 on the Internet 124. In step 510, the network device 118 transfers the multimedia data to the network interface card 410. In step 512, the network interface card 410 decodes the multimedia data into audio data and video data. In step 514, the network interface card 410 transfers the audio data to the audio interface card 412 through the hardware interface 422. The audio interface card 412 then communicates with the audio device 120 to produce sound. In step 516, the network interface card 410 transfers the video data to the video interface card 414 through the hardware interface 426. The video interface card 414 then communicates with the video device 122 to produce a video image on the video device 122.

In step 518, the network interface card 410 determines if all data necessary for fully executing the request/process operation has been received and processed. If the request/process operation is not complete, then the method returns to step 506. However, if the request/process operation is complete, then the method proceeds to step 520 where the network interface card 410 signals to the network device driver 404 that the request/process operation is complete. In step 522, the network device driver 404 signals to the operating system 402 that the request/process operation is complete. In step 524, the operating system 402 signals to the application program 202 that the request/process operation is complete. In step 526, the application program 202 resumes execution from the instruction immediately following the request to perform the request/process operation. As indicated in FIG. 5B, step 524 is performed when the computer system 400 is in privileged mode, and step 526 is performed when the computer system 400 is in user mode. The switch from privileged mode to user mode between these two steps results in another context switch.

As the foregoing descriptions illustrate, one advantage of the disclosed computer system architecture is that executing a request/process operation results in only two context switches, which is substantially fewer than the six context switches that result with prior art architectures. Further, the request/process operation requires no software data buffers, as opposed to the four software data buffers required with exemplary prior art architectures, and no data buffer handle exchanges, as opposed to the multiple data buffer handle exchanges among device drivers required with exemplary prior art architectures. Finally, the fact that the data and instructions remain local to the hardware layer 142 in the architecture of computer system 400 presents the opportunity for increased caching, which may result in additional performance improvements.

Persons skilled in the art will understand that even though the examples provided herein pertain to multimedia data request/process operations, any type of request/process operation may be executed using the architecture of the computer system 400. In addition, although the input/output devices in the computer system 400 are depicted as hardware interface cards, the principles of the present invention apply with equal force to any type of input/output devices implemented in the computer system 400. Alternative embodiments also allow for communication between a greater/lesser number of device drivers or hardware interface cards by adding/removing device drivers to the operating system 402 or hardware interface cards to/from the hardware layer 142. Further, one device driver may control more than one hardware interface card. Likewise, one hardware interface card may be controlled by more than one device driver. Finally, in alternative embodiments, the operating system 402 may be configured to initiate request/process operations without the influence or presence of an application program.

While the foregoing is directed to embodiments of the present invention, other and further embodiments of the invention may be devised without departing from the basic scope thereof. For example, the computer system 200 and the computer system 400 may be desktop computers, servers, laptop computers, palm-sized computers, tablet computers, game consoles, cellular telephones, computer based simulators or the like. The scope of the present invention is determined by the claims that follow.

We claim:

1. A computer-implemented method for transmitting data between device drivers using a virtual processing chain, comprising:
    configuring a first device driver, a second device driver and a third device driver to communicate directly with the other device drivers by a software interface, wherein the first device driver, the second device driver, and the third device driver are included in an operating system;
    directing a first input/output device to transmit data to that first device driver that is configured to control the first input/output device;
    directing the first device driver to transmit data directly to a second device driver;
    directing the second device driver to transmit data to a second input/output device that is controlled by the second device driver;
    issuing a bridge command from an application program to establish the direct communication between any two of the first, second and third device drivers; and
    storing the data transmitted between the first, second and third device drivers in a data buffer.

2. The method of claim 1, further comprising configuring the third device driver to control a third input/output device and to transmit data to the third input/output device.

3. The method of claim 2, wherein the second device driver is configured to transmit data directly to the third device driver.

4. The method of claim 3, wherein the first device driver is configured to transmit data directly to the third device driver.

5. The method of claim 1, wherein the first input/output device is a network interface card, the first device driver is a network device driver, the second input/output device is an audio interface card, the second device driver is an audio device driver, the third input/output device is a video interface card, the third device driver is a video device driver, and the network interface card is configured to request data from a network and to transmit the requested data to the network device driver in response to a command from the operating system, causing a first context switch.

6. The method of claim 5, wherein the data requested from the network is multimedia data, and the network device driver is configured to decode the multimedia data into audio data and video data, to transmit the audio data directly to the audio device driver and to transmit the video data directly to the video device driver, a second context switch occurring when the requested data has been processed and transmitted.

7. The method of claim 1, wherein the data transmitted from the first device driver to the second device driver comprises a frame buffer handle.

8. The method of claim 7, wherein the second device driver accesses data from a frame buffer, the accessed data being of a type associated with the second device driver, and transmits the data to the second input/output device.

9. The method of claim 1, wherein the first device driver is configured to process the data received from the first input/output device and to transmit processed data directly to the second device driver.

10. The method of claim 1, wherein each of the device drivers comprises a software handle comprising a data structure to identify the related input/output device, the application program issuing the bridge command to establish communication between the handles of the drivers.

11. A non-transitory computer-readable medium storing instructions for causing a computer to execute an operation by performing the steps of:
    configuring a first device driver, a second device driver and a third device driver to communicate directly with the other device drivers by a software interface, wherein the first device driver, the second device driver, and the third device driver are included in an operating system;
    directing a first input/output device to transmit data to that first device driver that is configured to control the first input/output device;
    directing the first device driver to transmit data directly to a second device driver;
    directing the second device driver to transmit data to a second input/output device that is controlled, by the second device driver;
    issuing a bridge command from an application program to establish the direct communication between any two of the first, second and third device drivers; and
    storing the data transmitted between the first, second and third device drivers in a data buffer.

12. The computer-readable medium of claim 11, wherein the first input/output device is a network interface card, the first device driver is a network device driver, the second input/output device is an audio interface card, the second device driver is an audio device driver, the third input/output device is a video interface card, and the third device driver is a video device driver.

13. The computer-readable medium of claim 12, wherein the network interface card is configured to request data from a network and to transmit that data to the network device driver.

14. The computer-readable medium of claim 13, wherein the data requested from the network is multimedia data, and the network device driver is configured to decode the multimedia data into audio data and video data, to transmit the audio data directly to the audio device driver and to transmit the video data directly to the video device driver.

15. The computer-readable medium of claim 11, wherein the first device driver is configured to process the data received from the first input/output device and to transmit processed data directly to the second device driver.

16. The computer-readable medium of claim 11, further including the steps of directing the second device driver to transmit data directly to the third device driver and directing the third device driver to transmit data to a third input/output device controlled by the third device driver.

17. The computer-readable medium of claim 11, further including the steps of directing the first device driver to transmit data directly to the third device driver and directing the third device driver to transmit data to a third input/output device controlled by the third device driver.

18. The computer-readable medium of claim 11, wherein the data transmitted from the first device driver to the second device driver comprises a frame buffer handle.

19. The computer-readable medium of claim 11, wherein the second device driver accesses data from a frame buffer, the accessed data being of a type associated with the second device driver, and transmits the data to the second input/output device.

20. The computer-readable medium of claim 11, wherein each of the device drivers comprises a software handle comprising a data structure to identify the related input/output device, the application program issuing the bridge command to establish communication between the handles of the drivers.

* * * * *